United States Patent Office 3,532,756
Patented Oct. 6, 1970

3,532,756
STABILIZED AQUEOUS SOLUTIONS OF
30 TO 80% FORMALDEHYDE
Roy H. Prinz, Robstown, and Bob C. Kerr, Kingsville, Tex., assignors to Celanese Corporation, New York, N.Y., a corporation of Delaware
No Drawing. Application Apr. 8, 1966, Ser. No. 541,093, which is a continuation of application Ser. No. 183,726, Mar. 30, 1962, and Ser. No. 360,137, Apr. 15, 1964, which in turn are continuations-in-part of applications Ser. No. 811,250, May 18, 1959; Ser. No. 858,868, Dec. 11, 1959; and Ser. No. 77,525, Dec. 22, 1960, which also in turn are the continuations-in-part of application Ser. No. 744,059, June 24, 1958. Divided and this application Feb. 19, 1968, Ser. No. 735,929
Int. Cl. C07c 45/24
U.S. Cl. 260—606  4 Claims

ABSTRACT OF THE DISCLOSURE

Solutions of 30–80% of formaldehyde in water stabilized against the formation of insoluble formaldehyde polymers therein by the inclusion of up to 1000 p.p.m. of a hydroxy ethyl cellulose.

---

This is a division of application Ser. No. 541,093, filed on April 8, 1966, now Pat. No. 3,379,769, which is a continuation-in-part of copending application Ser. Nos. 360,137, filed April 15, 1964 (now abandoned) and 183,726, filed March 30, 1962 (now abandoned). The latter two applications are in turn continuation-in-part of applications Ser. Nos. 77,525, filed Dec. 22, 1960 (now abandoned). 858,868, filed Dec. 11, 1959 (and now abandoned); and 811,250, filed May 18, 1959 (now U.S. Pat. 3,137,736 issued June 16, 1964). The latter is in turn a continuation-in-part of application Ser. No. 744,-059, filed June 24, 1958 (now abandoned).

This invention relates to formaldehyde and particularly to the stabilization of concentrated aqueous solutions of formaldehyde.

Aqueous solutions of formaldehyde of over 30% concentration tend to become cloudy, with the formation of formaldehyde polymers. It has long been known that it is desirable to have more highly concentrated solutions of formaldehyde in order to save the expenses of shipping and handling large quantities of water with the formaldehyde. To this end methanol has been added as a stabilizer. Thus ordinary commercial formaldehyde, containing 37% formaldehyde by weight, generally contains about 8 to 15% methanol to prevent precipitation of polymers. The presence of such large amounts of methanol is not always desirable, since it interferes with some reactions in which formaldehyde is employed. In addition, even when the methanol has no delatorious effect, the presence of an appreciable proportion of this material, serving only a stabilizing function, necessarily adds to the cost of the solution. Also, even with such large amounts of methanol the concentration of formaldehyde obtainable in a stable solution is not as high as desired.

It is therefore one object of this invention to produce stable concentrated formaldehyde solutions of relatively low methanol content.

Another object of this invention is the provision of novel stabilizers for formaldehyde, which stabilizers are effective even when present in very small proportions.

Other objects of this invention will be apparent from the following detailed description and claims. In this description and claims all proportions are by weight unless otherwise indicated.

In accordance with one aspect of this invention aqueous formaldehyde has incorporated therein a colloid which acts to stabilize the solution. Advantageously the colloid used in one which is soluble in the aqueous formaldehyde without coloring or clouding the formaldehyde solution. A particularly suitable colloid is a cold water soluble methyl cellulose such as hydroxypropyl methyl cellulose or methyl cellulose, per se. Examples of other colloids which may be employed include such high polymers as gelatin, (e.g. calf gelatin or pig gelatin), pectin and Irish moss extractive (carrageenan). Of the hydroxypropyl methyl celluloses which have been tested, excellant results have been obtained with these having a viscosity (when dissolved at 2% concentration in water at 25° C.) of at least 3000 e.g. 3000–5000 centipoises, a methoxy content of about 27 to 30% and a hydroxypropyl content of about 4–12%. Excellent results have also been obtained with methyl cellulose having a methoxy content of 26–33% and a viscosity (when dissolved at 2% concentration in water at 25° C.) of about 1200–10,000 cps. Good results have also been obtained by the use of ethyl cellulose (for instance ethyl cellulose of 48–49.5% ethoxy content) and by the use of such colloidal materials as lipophilic polyoxyethylene ethers of higher fatty alcohols such as lipophilic polyoxyethylene lauryl ether (e.g. Brij 30, a colorless oily liquid having an HLB, Atlas, of 9.5; a viscosity at 25° C. of 30 cps., a specific gravity of 0.95, soluble in toluol, acetone, methanol and mineral oil, insoluble in 5% $H_2SO_4$) and lipophilic sorbitan esters of higher fatty acids, such as sorbitan monolaurate (e.g. Arlacel 20, a lipophilic yellow oily liquid having an HLB, Atlas, of 8.6, a viscosity at 25° C. or 5000 cps., soluble in mineral oil), but these materials do not stabilize as effectively, or at such low concentrations as those mentioned previously. Other materials having an inhibiting effect, but usually producing a somewhat cloudy solution, are cellulose mixed esters such as mixed esters of cellulose and higher fatty acids, e.g. cellulose acetate stearate.

A particularly effective stablizer system comprises a hydroxyethyl cellulose such as "Natrosol 250 LR," "250 OR," or "250 JR"; all manufactured by Hercules Powder Co. This stabilizer is characterized by ready solubility in hot or cold water, which solubility increases with temperature (as contra-distinguished from related cellulose derivatives such as methyl cellulose whose solubility decreases with temperature): low viscosity in aqueous solution (e.g. methy cellulose solutions are highly viscous); low foaming tendency; and the ability to stabilize with great effectiveness the higher concentration formaldehyde solutions of 42.5 percent and greater e.g. 55 to 60% formaldehyde. Moreover, this stabilizer is a particularly good inhibitor of acid build-up at these higher concentrations.

Stabilizing proportions of up to about 1000 p.p.m. of this stabilizer, based upon the total weight of the solutiton are suitably employed to reduce the tendency to form insoluble formaldehyde polymers therein. Amounts of less than 1 p.p.m. up to about 250 p.p.m. are preferably employed with a non-ionic, water-soluble hydroxyethyl cellulose ("Natrosol 250 LR") having 2.5 moles of substituent combined with each anhydroglucose moiety (formed by reacting sodium hydroxide and ethylene oxide with cellulose). For example, 60% solution of formaldehyde in water was stable against the substantial formation of insoluble formaldehyde polymers therein for 25 days at 155° F. when 100 p.p.m. of hydroxyethyl cellulose ("Natrosol 250 LR") was employed as the stabilizer. An otherwise identical solution containing 50% formaldehyde was stable for 30 days at 110° F.

The proportions of colloid may be very small. For example, one hydroxypropyl methyl cellulose which is very effective does not dissolve completely uniformly in aqueous formaldehyde when the colloid is present in amount of 500 p.p.m. (based on the weight of the solution); that is, the colloid-containing solutions at this concentration and at higher concentrations (e.g. 1000 p.p.m.) although clear, have a granular appearance. This colloid is found to be an excellent stabilizer even at much lower concentrations, for example, less than 100 p.p.m., e.g. 10 p.p.m., and these lower concentrations are more desirable since the resulting solutions have less tendency to foam. Even with more soluble colloids it is usually preferable to use very small amounts, generally less than about 0.5% of dry colloid (based on the weight of the solution). Preferably the amount of colloid is such that the addition thereof has no substantial effect on the viscosity of the formaldehyde solution.

The concentration of formaldehyde is desirably above 30%, since with lower concentrations the problem of stability is not significant. The present invention makes possible stable formaldehyde solutions of well over 40% concentration, even when little or no methanol is present.

The stability of aqueous formaldehyde depends, as is well known, on the temperature. A solution which is not stable when stored at room temperature may remain substantially unchanged when stored at higher temperatures, e.g. 50° C. Similarly, cooling of concentrated aqueous formaldehyde decreases its stability and causes the formation of solid polymer. Like ordinary concentrated aqueous formaldehyde solutions, the solutions of the present invention may be solidified to form a paste, or in some cases, a slurry, by holding them at a low temperature for a sufficient time and may then be reliquefied by heating. However, with the solutions of the present invention the reliquefaction takes place without the formation of any substantial quantity of insoluble polymers of formaldehyde, even after many cycles of solidification and liquefaction. In contrast when conventional concentrated formaldehyde solutions are solidified in this manner a considerable residue of insoluble polymer is formed, the amount of insoluble polymer increasing with each cycle of solidification and liquefaction.

The solutions of the present invention may be used for the same purposes as conventional solutions of formaldehyde. When reacted with urea, they have the further advantage of yielding resins of improved clarity.

If desired, the aqueous formaldehyde may be treated, before or after the addition of the hydrophilic colloid, to remove ions therefrom. Such ions may be metallic ions (e.g. iron) picked up by the solution as a result of contact with metallic equipment, or formate ions resulting from the Cannizarro reaction in which two molecules of formaldehyde react to form a molecule of formic acid and a molecule of methanol. Removal of ions may be effected by passing the solution through one or more ion-exchange resins. Anion-exchange resins, alone or in combination with a cation-exchange resin treatment may be employed, as is conventional in the art. Solutions from which the ions have been removed have improved stability.

The formaldehyde solutions of high concentration may be produced in well known manner, as by dissolving gaseous formaldehyde or solid paraformaldehyde in water, or by vacuum concentration of dilute aqueous formaldehyde, or by pressure distillation of dilute aqueous formaldehyde, taking off a concentrated aqueous formaldehyde overhead, or by any suitable combination of these. The colloids used in this invention may be conveniently dissolved in the freshly prepared concentrated solutions (or, when appropriate, may be dissolved in the solution being concentrated). The pH of the solution may be varied, but for best results should not be such as to cause precipitation of the dissolved colloid; similarly, any anions or cations which tend to precipitate the colloid should be avoided, for best results. The following examples are given to illustrate this invention further.

EXAMPLE I (a) To a freshy prepared aqueous 40% solution of formaldehyde (produced as a product of the partial oxidation, with air or oxygen, of an aliphatic hydrocarbon, e.g. propane or butane), containing 1% methanol there was added 10 parts per million based on the total weight of solution of hydroxypropyl methyl cellulose (cold water-soluble "Methocel 60 HG" of 4000 centipoises viscosity when measured on a 2% solution in water at 20° C., and having a methoxyl content of 28–30% and a hydroxypropyl content of 7–12%.) (The hydroxypropylmethyl cellulose was first wetted with a small amount of methanol, after which a small amount of cold water was added, to form a solution which was then added to the formaldehyde solution). The resulting solution was stored at a temperature of 30° C. for a period of over 8 weeks without any observable polymerization. An identical sample without the hydroxypropyl methyl cellulose showed evidence of polymerization within 24 hours when stored under the same conditions.

(b) The hydroxypropyl methyl cellulose-containing solution was shipped at low winter temperature for a period of several days, and formed a slurry or paste. On gentle heating this paste dissolved to give a brilliantly clear solution which remained stable at room temperature, even after several months.

EXAMPLE II

The fresh colloid-containing solution of Example I was heated under a subatmospheric pressure of 70 mm. Hg absolute until its formaldehyde concentration was increased to 50%. The resulting solution remained stable when stored for over 4 weeks at a temperature of 38° C. An identical sample without the hydroxypropyl methyl cellulose showed evidence of polymerization when merely cooled to this temperature.

The stabilized solution was then shipped at low winter temperature for several days, and thereby solidified in slurry or pasty form. On reheating to 66° C. practically all of the product went back into the liquid condition except for a very small proportion, which was removed. The product was then subjected to 17 similar cycles of solidification (at 21° C.) and liquefaction (at 66° C.); substantially no further undissolved material was formed. In contrast, an otherwise identical formaldehyde solution without the hydroxypropyl methyl cellulose gave large amounts of insoluble material after one cycle of solidification and liquefaction and did not liquefy at all after two cycles.

EXAMPLE III

Example I was repeated except that the amount of methyl cellulose was increased to 100 p.p.m. The results were substantially the same as those described in Example I.

EXAMPLE IV

Example I was repeated twice, substituting 100 p.p.m. of "Methocel 60 HG" of 50 cps. viscosity and 400 cps. viscosity, respectively, in place of the hydroxypropyl methyl cellulose of 4000 cps. viscosity of Example I.

EXAMPLE V

Example I was repeated except that the concentration of formaldehyde was 44%. The solution was stored in an oven having a minimum temperature of 43° C. It remained stable without formation of solid polymer, whereas in the absence of the hydroxypropyl methyl cellulose an oven temperature of 60–65° C. was required to keep the solution stable at this concentration. When cooled and heated as in Example II, the results were substantially the same as described in Example III.

EXAMPLE VI

In this example conventional urea-formaldehyde resin formulations were modified by the use of the formaldehyde solutions of this invention.

(a) 702.5 grams of the solution obtained in accordance with Example I (b) was mixed with 98.9 grams methanol, 5 cc. of a 50% aqueous solution of triethanolamine, 25 cc. of 28% aqueous solution of ammonia, 330 grams of urea and 115.2 gram of flake paraformaldehyde and refluxed for 15 minutes at atmospheric pressure, then acidified with 2.5 cc. of 25% aqueous phosphoric acid and 15.0 grams of phthalic anhydride and further refluxed to give a water soluble urea formaldehyde resin of 100 cps. viscosity. A sparkling clear and stable resin solution was produced.

(b) Example VI(a) was repeated, except that borax was used in place of the triethanolamine and ammonia, the proportions used were:

| | |
|---|---|
| Formaldehyde solution | 654.0 |
| Methanol | 73.1 |
| Borax | 3.0 |
| Urea | 330.0 |
| Flake paraformaldehyde | 136.4 |
| 25% phosphoric acid | 8.0 |
| Phthalic anhydride | 10.0 | and the resin was cooked to a viscosity of 110 centiposes. A sparklingly clear and stable resin solution was produced.

(c) Example VII(a) and (b) were repeated except that commercial 37½% methanol-inhibited formalin was employed in place of the methyl cellose-containing formaldehyde solution; the amount of methanol separately added in the process was changed so that the total quantities of methanol present and the urea-formaldehyde-methanol ratios, were the same as those in Example VI(a) and (b), respectively; and slight changes were made in the proportions of the basic and acidic materials added, so as to keep the same pH conditions as in Example VI(a) and (b). The resin solutions thus produced were less clear than those of Example VI(a) and (b) and tended to become hazy.

EXAMPLE VII 774 grams of the solution of the reheated solution of Example II (pH- 4.3), 43.7 grams of water, 99 grams of methanol, and 5 cc. of a 50% aqueous solution of triethanolamine were agitated together; the mixture had a pH of 7.6 25 cc. of 28% aqueous ammonia were then added so that the pH rose to 8.7. Then 330 grams of urea were added, the mixture was heated to reflux at atmospheric pressure and refluxed at about 20° F. for 15 minutes; the pH at this stage was 7.8. 2.5 grams of phthalic anhydride were added to reduce the pH to 4.5 and the mixture was refluxed at atmospheric pressure until a sample of the product started to turn cloudy when dropped in ice water (about 3 hours of refluxing). Then 15 cc. of 50% aqueous triethanolamine were added to bring the pH to 7.1. A resin solution of unusually good clarity was obtained.

EXAMPLE VIII

Example VII was repeated, using the solution of Example V, with substantially the same results.

EXAMPLE IX

The colloid-containing solution of Example I was heatted under a vacuum of 27–28 inches (corresponding to a pressure of about 75 mm. Hg absolute), while evaporating water, and some formaldehyde, until the formaldehyde concentration of the residue reached 87%, at which time its temperature was 119° C. The hot clear liquid residue was a hard white solid on cooling. When the same distillation was carried out only until the formaldehyde concentration was 82% the hot clear liquid was a waxy soft solid on cooling.

EXAMPLE X

To freshly prepared aqueous solutions of formaldehyde of 46.89% concentration there were added 100 p.p.m. of one of the following colloids, respectively: Sure-Jell (a powdered pectin preparation manufactured by General Foods Corp. N.Y., N.Y. for making homemade jams and jellies, and containing fruit pectin together with dextrose and citric acid); water soluble Irish moss extractives (Carrageenan, in mixed lambda and kappa forms, sold under the trademark "Sea-Kem" of which various viscosity grades were tested including "type 3" having a water viscosity of 9°–125° MacMichael or about 400–570 centipoised;; "type 6" having a water viscosity 400–500° MacMichael or about 1800–2200 centipoises; "type 8" having a water viscosity of 10–20° MacMichael or about 45–90 centipoises; and "type 14" having a water viscosity of 10–40° MacMichael or about 45–180 centipoises); and calf gelatin ("Knox gelatin"). The resulting solutions were then maintained at 38° C. for 20 days; none of them showed observable polymerization during this period.

EXAMPLE XI

To a freshly prepared aqueous 42.5% solution of formaldehyde (produced as in Example I) there were added the stabilizers described below in the amounts indicated below. The stability of each of the resulting solutions was tested by allowing it to stand at 73° F. At this temperature the same formaldehyde solution, to which no stabilizer was added, was unstable; i.e., it showed polymerization in less than one day;

(a) Hydroxypropyl methyl cellulose (cold water-soluble "Methocel 65 HG" of 4000 cps. viscosity when measured on a 2% solution in water at 20° C., and having a methoxyl content of 27–29% and a hydroxypropyl content of 4 to 7.5%) used in proportions of 10 p.p.m., 50 p.p.m., 100 p.p.m. and 1000 p.p.m., based on the weight of the formaldehyde solution. For the experiments using 10 p.p.m., 50 p.p.m. and 100 p.p.m., the stabilizer was added as a 1% solution thereof in water; the final stabilized formaldehyde solution was clear. For the experiment using 1000 p.p.m. the dry stabilizer was added directly to the formaldehyde solution; some of the added stabilizer remained undissolved at this concentration. The stability period in each case was over 30 days, after which the tests on the stable solutions were discontinued.

(b) Methyl cellulose (cold water-soluble "Methocel Technical" having a methoxyl content of 26–33%). Grades of this material having viscosities of 1500, 4000, and 8000 cps. (when measured on 2% solution in water at 20° C.) were used, each grade in proportions of 10 p.p.m., 50 p.p.m., 100 p.p.m. and 1000 p.p.m., based on the weight of the formaldehyde solution. For the experiments using 10 p.p.m., 50 p.p.m. and 100 p.p.m. the stabilizer was added as a 1% solution thereof in water; the final stabilized formaldehyde solution was clear. For the experiment using 1000 p.p.m. the dry stabilizer was added directly to the formaldehyde solution; some of the added stabilizer remained undissolved at this concentration. The stability period in each case was over 30 days, after which the tests on the stable solutions were discontinued.

(c) Ethyl cellulose ("Ethocel, standard," of ethoxy content 48–49.5%, having a viscosity of about 200 cps. when measured on a 5% solution in 80–20 toluene-ethanol at 25° C.), used in proportions of 10 p.p.m., 50 p.p.m., 100 p.p.m. and 1000 p.p.m., based on the weight of the formaldehyde solution. For the experiments using 10 p.p.m., 50 p.p.m. and 100 p.p.m. the stabilizer was added as a 1% solution thereof in methanol; the final stabilized formaldehyde solution was clear. For the experiment using 1000 p.p.m. the dry stabilizer was added directly to the formaldehyde solution; some of the added stabilizer remained undissolved at this concentration. For the 10 p.p.m. proportion the stability period of the resulting formaldehyde solution was 4 days. For the other proportions the stability period in each case was over 30 days, after which the tests on the stable solutions were discontinued.

(d) Sorbitan monolaurate (Arlacel 20), used in proportions of 50 p.p.m. and 100 p.p.m. The stabilizer was incorporated by first dissolving it, in 5% concentration, in methanol, then adding water, and then adding the water-methanol solution to the aqueous formaldehyde solution in amount such that the final concentration of formaldehyde was 42%; the stabilized formaldehyde solution was clear. The stability periods were 3 days (for 50 p.p.m.) and 16 days (for 100 p.p.m.).

(e) Polyoxyethylene lauryl ether (Brij 30) used in proportions of 50 p.p.m., 100 p.p.m. and 1000 p.p.m. For the experiments at, 50 p.p.m. and 100 p.p.m. the stabilizer was incorporated by first dissolving it, in 5% concentration, in methanol, then adding water, and then adding the water-methanol solution to the aqueous formaldehyde solution in amount such that the final concentration of formaldehyde was 42%; the stabilized formaldehyde solution was clear. For the experiment at 1000 p.p.m. the "Brij 30" was added directly to the aqueous formaldehyde and the resulting solution was hazy. The stability periods were 9 days (for 50 p.p.m.), 12 days (for 100 p.p.m.) and 13 days (for 1000 p.p.m.).

(f) Mixture of 5 p.p.m. "Methocel 60 HG" (4000 cps.) and 5 p.p.m. "Methocel, Tech." (8000 cps.). The stability period was over 18 days, after which the test on the stable stabilized solution was discontinued.

(g) Mixture of 5 p.p.m. "Methocel 60 HG" (4000 cps.) and 5 p.p.m. "Brij 30." The stability period was over 18 days, after which the test on the stable stabilized solution was discontinued.

(h) Mixture of 10 p.p.m. "Methocel 60 HG" (4000 cps.) and 5 p.p.m. silicone antifoam emulsion ("GE 60") The stability period was over 18 days, after which the test on the stable stabilized solution was discontinued.

(i) Mixture of 5 p.p.m. "Methocel 60 HG" (4000 cps.) and 5 p.p.m. "Methocel 60 HG" (50 cps.). The stability period was over 10 days, after which the test on the stable stabilized solution was discontinued.

(j) Mixture of 5 p.p.m. each of the viscosity grades 50 cps., 400 cps. and 4000 cps. of "Methocel 60 HG." The stability period was over 18 days, after which the test on the stable stabilized solution was discontinued.

(k) Hydroxyethylcellulose. The stability period was 5 days for 100 p.p.m. and 7 days for 1000 p.p.m. at 75° F. At the same temperature the same sample of unstabilized aqueous formaldehyde had a stability period of only 20 hours. The hydroxethylcellulose used was obtained by foam-fractionation from a commercial hydroxyethylcellulose (Natrosol Type 250). In this foam-fractionation air was passed into the base of a 20 tray Oldershaw fractionating column containing, in the base, a 1% aqueous solution of said Natrosol; from the top of the column 1/10 of the total weight of solution was recovered as a foam, which was then evaporated to dryness under vacuum to yield the hydroxethylcellulose used in the stability tests.

EXAMPLE XII 100 cc. of the unstabilized formaldehyde solution of Example XII was added to a solution of 0.1 gram of cellulose acetate stearate (soluble in acetone, p-dioxane, o-nitrotoluene and glacial acetic acid and not soluble, at concentrations above 1%, in methanol, butanol, benzene, 2,2,4-trimethylpentane or water) in 2 cc. of acetone. The resulting solution was allowed to stand at 73° F. After 12 days the cloudy solution was still stable and the test was discontinued.

EXAMPLE XIII

Example I (a) was repeated, with similar results, using aqueous formaldehyde obtained by oxidation of methanol in place of the aqueous formaldehyde obtained by oxidation of aliphatic hydrocarbon.

EXAMPLE XIV

Example XI was repeated, using as the stabilizer 100 p.p.m. of lipophilic glycerol sorbitan laurate (Atlas G– 672, a light amber oily liquid whose HLP, Atlas, is 7.6). The stability period of the resulting formaldehyde solution was 7 days at 73° F.

EXAMPLE XV

To the unstabilized formaldehyde solution of Example XI, there was added 1000 p.p.m. of raw egg white. The resulting cloudy solution was stable for 6 days.

The following examples further illustrate the use of non-cellulosic colliodal dispersing or suspending agents as stabilizers.

EXAMPLE XVI

Aqueous formaldehyde of 40% concentration was well stabilized by the addition of 0.1% of Burtonite V–40–E (carragheonan extract from Burtonite Company).

EXAMPLE XVII

The stability of aqueous formaldehyde of 40% concentration was improved by the addition of polymers containing oxazolidinone groups, e.g. 0.1% of either a water soluble homopolymer of N-vinyl-5-methyl-2-oxaolidinone or a 50–50 copolymer of vinyl acetate and N-vinyl-5-methyl-2-oxazolidinone. Such polymers are sold under the trademark Devlex (e.g. Devlex 130 and Devlex A–515).

EXAMPLE XVIII

An improvement in stabilizing power may be attained by cooking the colloid with the formaldehyde solution. For instance, 0.1% of zein was added to 40.5% aqueous formaldehyde solution and the solution was brought to the boil and then cooled. In two other experiments, starch and pectin-free amylose were substituted, respectively, for the zein, using the same procedure.

EXAMPLE XIX

The stability of aqueous formaldehyde of 40% concentration was improved by the addition of 0.1% of a cationic colloidal material (Aerosol C–61, a mixture of the octadecyl amine and octadecyl guanidine salts of octadecylcarbamic acid reacted with ethylene oxide; Aerosol C–61 contains 70% active ingredient dissolved in isopropyl alcohol and water).

EXAMPLE XX 500 parts per million of polyvinyl alcohol (Matheson-Coleman-Bell Reagent Crade 98% hydrolized) were added to 42.5% formalin. The solution was stable for 20 hours at 75° F. In the absence of the polyvinyl alcohol the solution was stable for only 9 hours at 75° F.

The following example illustrates the fact that the stabilizers of this invention are effective for stabilization of solutions of formaldehyde of less than 30% concentration:

EXAMPLE XXI

A 26% aqueous solution of formaldehyde, which may be prepared by dilution of the solution of Example I, was mixed with 100 p.p.m. of the "Methocel" of 4000 cps. viscosity (described in Example II(b)). The resulting solution was maintained at 18–22° F. The solution containing the stabilizers of this invention are at least twice as stable as the unstabilized 26% formaldehyde solution, under these conditions. Thus, the unstabilized solution showed polymerization in about two days while the stabilized solution was clear after six days.

In the above examples the pH of the unstabilized formaldehyde solution was within the range of about 3–7, e.g., 5.5.

As shown by Example IX the stabilizers of this invention may be used in the production of highly concentrated melts (having concentrations of formaldehyde of above 80% for instance) by the evaporation of water from aqueous formaldehyde. These melts are useful in making paraformaldehyde. When the stabilizers of this invention are present there is less tendency for deposits of solid polymer to form on the heated pipes or other heated containers used for transferring the hot molten material. However, the stabilizers of this invention have found their greatest utility in aqueous formaldehyde of about 40 to 50% concentration.

An improvement in stability has also been attained by the use of cellulose acetate (e.g. 10 p.p.m. and 1000 p.p.m. of water soluble cellulose acetate having an acetyl value, calculated as combined acetic acid, of about 20); cellulose gum (e.g. 1000 p.p.m. of Hercules CMC–7–HS sodium salt of carboxymethyl cellulose of 0.7 substitution, when the pH of the resulting solution was 2–3); sodium cellulose sulfate (e.g. at a concentration of 1000 p.p.m. when the pH of the resulting-solution was 2–6); or hydroxyethyl cellulose (e.g. 100 p.p.m. Cellosize WP 4400 Union Carbide Chemical Corp., when the pH was 3–6); all p.p.m. being amounts added to 42% aq. formaldehyde.

It has also been found that the presence of a colloid in very small proportions has the effect of inhibiting the crossed-Cannizzaro reaction, by which reaction formaldehyde is converted to methanol and formic acid. Thus, when aqueous formaldehyde was tested in accordance with the Pajunen method described in "Formaldehyde" by J. F. Walker, 2nd Edition, (Reinhold Publishing Corp.), it was found that the incorporation of methyl cellulose or hydroxypropyl methyl cellulose decreased the amount of formic acid formed at room temperature over a 4 day period even when the proportion of the cellulose ether was only 1 p.p.m. (This proportion of 1 p.p.m. is based on the weight of a 42% formaldehyde solution. The actual amount present was even less since the formaldehyde solution was diluted to 0.1 M and then further diluted with an equal volume of 0.05 N NaOH, for the test). Much better results were obtained with 10 p.p.m. of the cellulose ether, whereas 100 p.p.m. gave results which were not as good as those with 10 p.p.m. Very good results were also obtained with carboxymethyl cellulose, as the sodium salt, Cellulose Gum (e.g. in amount of 10 and 100 p.p.m.); carrageenan (e.g. 1–100 p.p.m. of Sea-Kem type 3) and pectin (e.g. 10 p.p.m. of Sure-Jell). A good result was also obtained with algin (e.g. 50 p.p.m. of Kelgin) Since it is very desirable that aqueous formaldehyde form as little acid as possible on storage the addition of colloids for this purpose is highly advantageous.

For example, when a 46% formaldehyde solution was stored at 100° F., 110° F. and 120° F. for 24 days there were formed 60 p.p.m., 120 p.p.m. and 150 p.p.m. of acid (expressed as formic acid) respectively; when 10 p.p.m. of hydroxypropyl methyl cellulose was present the corresponding figures for the amount of acid formed were 20 p.p.m., 30 p.p.m. and 40 p.p.m.

As previously stated, the amount of colloid is preferably such as to have no substantial effect on the viscosity of the formaldehyde solution. For example, a 41.7% aqueous formaldehyde solution has a relative viscosity, referred to pure water, at 40° C. of about 1.610–1.623, while the same solution containing 10 p.p.m. of a hydroxypropyl methyl cellulose has a relative viscosity of 1.629–1.635.

EXAMPLE XXII

A series of solutions of formaldehyde in water, ranging from 50% to 60% formaldehyde based upon the total weight of the formaldehyde solution, containing 100 p.p.m. and 200 p.p.m. of hydroxyethyl cellulose ("Natrosol 250 LR"), respectively, were prepared and tested for stability. In each instance, the stability test was discontinued after the expiration of the 30th day.

The 50% formaldehyde solutions, and a similar solution containing 10 p.p.m. of methyl cellulose (8000 cps.) (as well as 2 p.p.m. of "GE–60" silicone anti-foaming agent) were clear and stable for a period of 30 days at 120° F. At a 52% formaldehyde level, while the hydroxyethyl cellulose solutions still exhibited stability of at least 30 days at 120° F., the methyl cellulose sample was stable for only 4 days at the same temperature (although at 125° F., the solutions were equivalent in stability). 55% formaldehyde solutions of hydroxyethyl cellulose were stable for at least 30 days at 135° F. 60% solutions were stable for 25 days at 155° F., and when pretreated with an ion exchange resin (e.g. Illco A—424) to deacidify the solution to an initial acidity calculated as formic acid as 0.005% or less, these solutions could be safely stored at 150° F. for at least 20 days without formation of any visible polymer.

Similar results were achieved with proportions of 10 and 50 p.p.m. of hydroxyethyl cellulose, e.g. a 52% formaldehyde solution containing 10 p.p.m. of hydroxyethyl cellulose was stable for 30 days at 125° F., and a 55% formaldehyde solution containing 50 p.p.m. of hydroxyethyl cellulose was stable for 30 days at 135° F.

It is to be understood that the foregoing detailed description is given merely by way of illustration and that many variations may be made therein without departing from the spirit of our invention.

The embodiments of the invention in which an exclusive property or privilege is claimed are defined herein:

1. A stabilized solution of 30 to 80 percent of formaldehyde in water, containing a stabilizing amount, up to about 1,000 p.p.m., of hydroxyethyl cellulose.

2. A stabilized solution of 30 to 80 percent of formaldehyde in water, containing a stabilizing amount, up to about 100 p.p.m., of hydroxyethyl cellulose.

3. The stabilized solution of claim 1, also comprising less than 2% of methanol.

4. A stabilized solution of at least 50% up to 80% of formaldehyde in water, containing a stabilizing amount, up to about 200 p.p.m. of hydroxyethyl cellulose.

References Cited

UNITED STATES PATENTS 3,137,736   6/1964   Prinz et al. _____ 260—606

BERNARD HELFIN, Primary Examiner

ROSCOE HARRIS LILES, Assistant Examiner

UNITED STATES PATENT OFFICE
CERTIFICATE OF CORRECTION

Patent No. 3,532,756    Dated  October 6, 1970

Inventor(s)    Roy H. Prinz et al.

It is certified that error appears in the above-identified patent and that said Letters Patent are hereby corrected as shown below:

Column 2, line 41, "OR" should read -- GR --. Column 5, line 49, "20° F." should read -- 203° F. --.

Signed and sealed this 4th day of May 1971.

(SEAL)
Attest:

EDWARD M. FLETCHER, JR.  
Attesting Officer

WILLIAM E. SCHUYLER, JR.  
Commissioner of Patents